(No Model.)
W. L. LANGLEY.
PICKER STEM FOR COTTON HARVESTERS.
No. 382,535. Patented May 8, 1888.
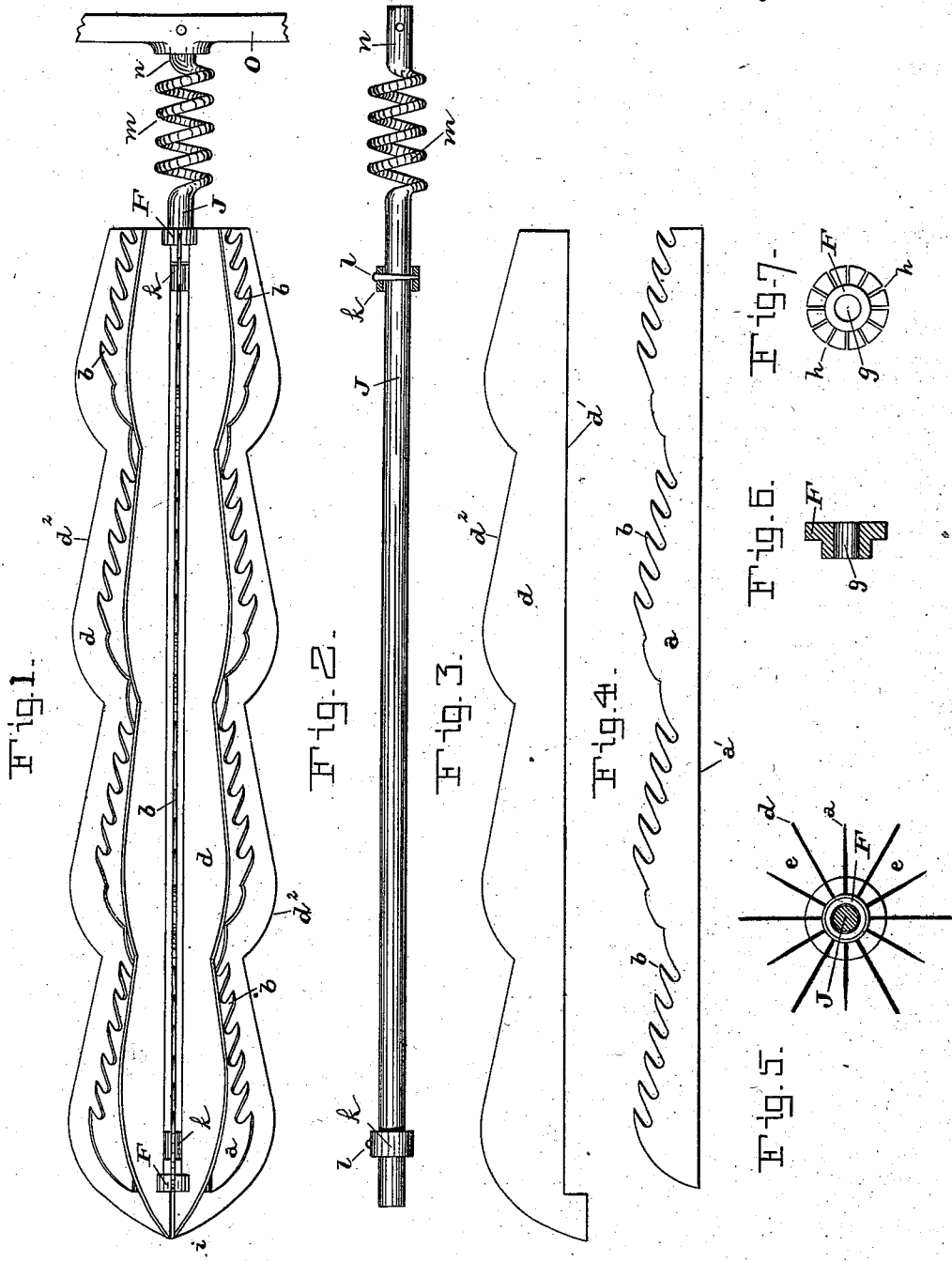
WITNESSES:
A. E. Eader.
John E. Morris.
INVENTOR:
Wm L. Langley.
BY Chas. B. Mann.
ATTORNEY.

UNITED STATES PATENT OFFICE.

WILLIAM L. LANGLEY, OF NEWARK, NEW JERSEY, ASSIGNOR TO THE LANGLEY COTTON HARVESTER COMPANY OF NEW YORK CITY.

PICKER-STEM FOR COTTON-HARVESTERS.

SPECIFICATION forming part of Letters Patent No. 382,535, dated May 8, 1888.

Application filed December 20, 1886. Serial No. 222,116. (No model.)

*To all whom it may concern:*

Be it known that I, WILLIAM L. LANGLEY, a citizen of the United States, residing at Newark, in the county of Essex and State of New Jersey, have invented certain new and useful Improvements in Picker-Stems for Cotton-Harvesters, of which the following is a specification.

This invention relates to a picker-stem for picking cotton from the bolls on plants in the field. Stems of this character are used on machines which are mounted on wheels to be moved in the field along a row of cotton-plants.

The invention is illustrated in the accompanying drawings, in which—

Figure 1 is a side view of the improved picker-stem. Fig. 2 is a view of the spindle having one end spiraled to make it flexible. Fig. 3 is a view of one longitudinal guard-plate. Fig. 4 is a view of one tooth-plate finished ready to be secured in the stem. Fig. 5 is a cross-section of the picker-stem. Figs. 6 and 7 show, respectively, cross-section and front views of one of the heads.

The body part of the picker-stem, in the present instance, is composed of longitudinal guard-plates, each having exterior undulatory edges, and said plates secured to and around circular heads. From this description, and by reference to the drawings, it will be seen the general shape or configuration of the picker-stem is that of a cylindrical body, which has undulations along its length. This feature obviously may be produced in a picker-stem by other constructions than the said plates here shown.

The letter $a$ designates a longitudinal plate of suitable metal, one edge, $a'$, of which is straight and smooth, and the other edge is provided with inclined teeth $b$. The edge of the plate whereon the teeth $b$ are cut has an undulatory shape, and the said teeth are located or arranged only on one incline of each undulation. Thus the teeth are on those inclines which pitch in one direction—that is, rearward. The longitudinal tooth-plates are combined with longitudinal guard-plates $d$, and arranged so that each tooth-plate, with its teeth pointing inward or toward the shank end of the stem, shall be between two guard-plates and form longitudinal spaces $e$. The guard-plates $d$ have a straight smooth edge, $d'$, and an exterior undulatory-shaped edge, $d^2$. The guard-plates are broader or have greater width than the tooth-plates. All the plates are secured by any suitable means to two circular heads, F, from which they radiate, as shown in Fig. 5. Each head has a central hole, $g$, for the spindle, and on the rim radial slots $h$, each of which receives an end of one of the longitudinal plates, which latter may be confined in the slots by the application of solder or any other suitable means. At the point end $i$ of the picker-stem the longitudinal plates converge, and the said point may be strengthened or re-enforced in any desired manner. As the guard-plates are broader than the tooth-plates, (see Figs. 3, 4, and 5,) their exterior edges, $d^2$, serve to protect the teeth $b$ on the other plates. The undulations on the guard-plates in shape, length, and position coincide with the undulations on the tooth-plates.

The body part of the picker-stem is mounted on a fixed spindle, J, and by preference is free to revolve thereon. That part of the spindle which passes through the body part is straight, and has two collars, $k$, secured by screws or pins $l$. The collars serve to retain the body part on the spindle. One end of the spindle has a spiral part, $m$, which terminates with a straight end, $n$, the latter being rigidly secured to a holder, O, which is a suitable arm or plate constituting part of a machine not necessary to describe in this connection. The spiral part $m$, it will be seen, is integral with the spindle, and when properly tempered will support the picker-stem horizontally, and also act as a spring whereby the point end of the picker-stem may yield or move laterally in all directions, a desideratum in devices of this kind.

It is obvious that a spindle or shank having a spiral spring integral with it for the purpose described may be used in picker-stems where the body part has a different construction and where said body part does not revolve.

The feature which has been described as undulatory along the length of the picker-stem adds greatly to the efficiency of the device as a cotton-picker, for the reason that as the picker-stem is withdrawn from the cotton-plant in contact with a boll of cotton the undulations impart to the boll a certain amount of motion, whereby the loose cotton protruding from the boll is swung or flapped against the teeth.

No claim is made herein to a cotton-picker stem having longitudinal plates provided with teeth and arranged to form a longitudinal open slot or space between each two plates, such feature being claimed in my application for United States, Letters Patent Serial No. 217,411, filed October 28, 1886; nor to a cotton-picker stem having longitudinal plates provided with outward-pointing teeth, such feature being claimed in my application for United States Letters Patent, Serial No. 222,115, filed December 15, 1886.

Having described my invention, I claim and desire to secure by Letters Patent of the United States—

1. A cotton-picker stem having its body portion provided with longitudinal toothed plates with undulatory outer edges, said plates having teeth only on those parts of the undulatory edges which incline inward and toward the butt of the stem, substantially as described.

2. A cotton-picker stem having longitudinal tooth-plates and longitudinal guard-plates, the latter provided with undulatory edges, for the purpose set forth.

3. A cotton-picker stem having longitudinal tooth-plates and longitudinal guard-plates, the latter provided with undulatory outer edges, the said plates being arranged in rows on said stem so as to form longitudinal spaces between the tooth-plates and guard-plates, for the purpose set forth.

4. A cotton-picker stem consisting of the perforated end $n$, with holder O connected thereto, the body portion of the stem having heads F, with radial slots $h$, the longitudinal tooth-plates and guard-plates, and an intermediate spring portion, said perforated end, body portion, and spring being integral, the whole constructed and arranged to operate as shown and described.

In testimony whereof I affix my signature in the presence of two witnesses.

WILLIAM L. LANGLEY.

Witnesses:
JOHN E. MORRIS,
CHAS. B. MANN.